US012246731B2

(12) United States Patent
Kobylinski et al.

(10) Patent No.: US 12,246,731 B2
(45) Date of Patent: Mar. 11, 2025

(54) APPARATUS AND METHOD FOR PROVIDING VEHICLE ATTRIBUTES

(71) Applicant: JAGUAR LAND ROVER LIMITED, Warwickshire (GB)

(72) Inventors: Krzysztof Kobylinski, Warwickshire (GB); Thomas Osgood, Warwickshire (GB); Navneesh Phillip, Warwickshire (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 124 days.

(21) Appl. No.: 17/594,300

(22) PCT Filed: Apr. 7, 2020

(86) PCT No.: PCT/EP2020/059847
§ 371 (c)(1),
(2) Date: Oct. 8, 2021

(87) PCT Pub. No.: WO2020/207999
PCT Pub. Date: Oct. 15, 2020

(65) Prior Publication Data
US 2022/0161807 A1 May 26, 2022

(30) Foreign Application Priority Data
Apr. 8, 2019 (GB) ...................... 1904967

(51) Int. Cl.
*B60W 50/00* (2006.01)
*G01C 21/36* (2006.01)
(52) U.S. Cl.
CPC ..... *B60W 50/0097* (2013.01); *B60W 2556/50* (2020.02); *G01C 21/3617* (2013.01)

(58) Field of Classification Search
None
See application file for complete search history.

(56) References Cited

U.S. PATENT DOCUMENTS

2005/0228553 A1* 10/2005 Tryon ................... B60L 50/16
701/22
2006/0085131 A1* 4/2006 Yopp .................. B60W 30/095
701/469
2017/0088000 A1 3/2017 Payne et al.

FOREIGN PATENT DOCUMENTS

| GB | 2528064 A | 1/2016 |
| WO | 2015074744 A1 | 5/2015 |
| WO | 2019115437 A1 | 6/2019 |

OTHER PUBLICATIONS

Great Britain Intellectual Property Office, Combined Search and Examination Report under Sections 17 and 18(3) Issued in Application No. GB1904967.5, Oct. 1, 2019, 7 pages.

(Continued)

*Primary Examiner* — Adam D Tissot
(74) *Attorney, Agent, or Firm* — McCoy Russell LLP

(57) ABSTRACT

Embodiments of the present disclosure provide a controller comprising: input means for receiving from a communication means associated with a vehicle a request for a first prediction of a first attribute associated with the vehicle; processing means for determining the first prediction of the first attribute in dependence on the request, wherein the first prediction comprises an indication of the first attribute and an indication of a first confidence associated with the first attribute; and output means for outputting, via the communication means, a first prediction response comprising the first prediction.

18 Claims, 3 Drawing Sheets

(56) References Cited

OTHER PUBLICATIONS

ISA European Patent Office, International Search Report and Written Opinion Issued in Application No. PCT/EP2020/059847, Jun. 23, 2020, WIPO, 11 pages.

* cited by examiner

APPARATUS AND METHOD FOR PROVIDING VEHICLE ATTRIBUTES

CROSS REFERENCE TO RELATED APPLICATIONS

The present application is a U.S. National Phase of International Application No. PCT/EP2020/059847 entitled "APPARATUS AND METHOD FOR PROVIDING VEHICLE ATTRIBUTES," and filed on Apr. 7, 2020. International Application No. PCT/EP2020/059847 claims priority to Great Britain Patent Application No. 1904967.5 filed on Apr. 8, 2019. The entire contents of each of the above-listed applications are hereby incorporated by reference for all purposes.

TECHNICAL FIELD

The present disclosure relates to an apparatus and a method, and to an apparatus and a method for providing indications of attributes associated with a vehicle. Aspects of the disclosure relate to a controller, to a system, to a vehicle, to a method and to computer software.

BACKGROUND

So-called 'intelligent features' are increasingly common which, for example, attempt to predict a user's needs or behaviour. Such predictions may be made on the basis of learning of the user's behaviour. For example, modern home thermostats attempt to predict aspects of heating control for the user's home based on the user's behaviour patterns. However, despite the proliferation of these intelligent features, they increasingly operate in a stand-alone fashion and are only able to carry out limited functionality which is specific to the intended application. In this way, there is often duplication and inefficiency.

It is an object of embodiments of the disclosure to at least mitigate one or more of the problems of the prior art.

SUMMARY

Aspects and embodiments of the disclosure provide a controller, a system, a vehicle, a method and to computer software.

According to an aspect of the disclosure, there is provided a controller, comprising processing means for determining a prediction of an attribute in dependence on a request, wherein the prediction comprises an indication of the attribute and an indication of a confidence associated with the attribute. The controller provides predictions of attributes and the confidence associated with the prediction of the attribute. The controller may act as a server on a network to receive the requests and provide the predictions in dependence thereon.

According to an aspect of the disclosure, there is provided a controller, comprising input means for receiving from a communication means associated with a vehicle, a request for a first prediction of a first attribute associated with the vehicle, processing means for determining the first prediction of the first attribute in dependence on the request, wherein the first prediction comprises an indication of the first attribute and an indication of a first confidence associated with the first attribute, and output means for outputting, via the communication means, a first prediction response comprising first prediction. The controller provides predictions of attributes and the confidence associated with the prediction of the attribute in dependence on the received request. The controller may act as a server on a network to receive the requests and to provide the predictions in dependence thereon The processing means is optionally arranged or configured to request a second prediction of a second attribute associated with the vehicle and determine a second prediction response comprising an indication of the second attribute and an indication of a second confidence associated with the second attribute, and determine the first prediction response in dependence on the second prediction response. The controller may determine the predictions of the first and second attributes. The prediction of a second attribute may be used in determining the prediction of the first attribute.

The processing means is optionally arranged or configured to control the output means to output, via the communication means, a request for a second prediction of a second attribute associated with the vehicle and to receive, via the input means, a second prediction response comprising an indication of the second attribute and an indication of a second confidence associated with the second attribute, and determine the first prediction response in dependence on the second prediction response. If the prediction of the first attribute requires a prediction of another attribute, the controller is able to request the prediction of the second attribute. A network of prediction controllers may provide respective predictions.

The processing means may be arranged or configured to control the output means to output, via the communication means, a request for third prediction of a third attribute associated with the vehicle and to receive via the input means a third prediction response comprising an indication of the third attribute and an indication of a third confidence associated with the third attribute, and determine the first prediction response in dependence on the second and third prediction responses. If the prediction of the first attribute requires a prediction of another attribute, the controller is able to request the prediction of the third attribute. A network of prediction controllers may provide respective predictions.

The processing means may be arranged or configured to control the output means to output, via the communication means, a request for data associated with the vehicle and to receive via the input means data corresponding to the request, wherein the processing means is arranged or configured to determine the first prediction in dependence on the received data. If the prediction of the first attribute requires data associated with the vehicle, the controller is able to request the data. The data associated with the vehicle may be associated with a user of the vehicle, for example a geographic location of the user, a temperature of the user, a gaze direction of the user, whether the user is undertaking an activity. Other data associated with the user may be envisaged.

Optionally the processing means is arranged or configured to operatively execute a self-learning agent for determining the first prediction of the first attribute. The ability of the controller to provide accurate predictions may improve with learning of the agent.

The request for the first prediction of the first attribute may comprise a message having a predetermined format. Use of messages of the predetermined format allows extension of new features using the predetermined format.

The first prediction response optionally comprises a message having a predetermined format comprising the indication of the first attribute and the first confidence. The response may be utilised by any entity interpreting the message.

The prediction response may comprise unique identifying information. The response may be uniquely identified. The response may be easily associated with the request.

The unique identifying information may comprises one or more of an ID and timestamp information. The ID may identify the response. The timestamp may identify a duration of the response.

The first attribute associated with the vehicle may be associated with a user of the vehicle. The prediction may provide the prediction associated with the vehicle user.

According to an aspect of the disclosure, there is provided a system, comprising a first controller, a first feature module supporting a feature of a vehicle, a communication means for supporting communication between the first controller and the first feature module, wherein the first feature module is arranged or configured to output via the communication means a request for a prediction of a first attribute associated with the vehicle, and the first controller is arranged or configured to receive the request via the communication means and to output the prediction response via the communication means to at least the first feature module.

Optionally the first feature module operatively executes on a processing means connected to the communication means.

The first feature module may be arranged or configured to control one or more systems of the vehicle in dependence on the prediction response.

The prediction response may be received by the first feature module and a second feature module via the communication means.

The first feature module is optionally arranged or configured to output via the communication means a second request for a second prediction of a second attribute associated with the vehicle, wherein the second controller is arranged or configured to receive the second request, to determine the second prediction of the second attribute in dependence on the second request, wherein the second prediction comprises an indication of the second attribute and an indication of a confidence associated with the second attribute, and to output, via the communication means, a second prediction response comprising the second prediction for receipt by the first feature module.

The first controller is optionally arranged or configured to output, via the communication means, a request for a third prediction of a third attribute associated with the vehicle and to receive via the communication means a third prediction response comprising the third prediction, wherein the third prediction comprises an indication of the third attribute and an indication of a confidence associated with the third attribute.

Optionally the first controller is arranged or configured to output determine the first prediction of the first attribute in dependence on the third prediction.

The communication means may be a communication network arranged or configured to communicably couple the first controller and the first feature module.

Each prediction response may be a message output onto the communication network for receipt by one or more network nodes.

The communication network may be one of an Ethernet or FlexRay based network.

According to another aspect of the disclosure, there is provided a vehicle comprising a controller or the system as described above.

According to a further aspect of the disclosure, there is provided a method, comprising receiving from a communication means associated with a vehicle a request for a prediction of an attribute associated with the vehicle, determining the prediction of the attribute in dependence on the request, and an indication of a confidence associated with the predicted attribute, outputting, via the communication means, a prediction response comprising the indication of the prediction and the indication of the confidence.

The method optionally comprises outputting, via the communication means, a request for second prediction of a second attribute associated with the vehicle;

The method may comprise receiving, via the communication means, a second prediction response comprising an indication of the second prediction and an indication of a second confidence associated with the second prediction; and The method may comprise determining the prediction of the first attribute in dependence on the second prediction response.

The method may comprise outputting, via the communication means, a request for third prediction of a third attribute associated with the vehicle.

The method may comprise receiving, via the communication means, a third prediction response comprising the indication of the third prediction and an indication of a confidence associated with the third prediction.

Optionally the method comprises determining the prediction of the first attribute in dependence on the second and third prediction responses.

According to a still further aspect of the disclosure, there is provided computer software which, when executed, is arranged or configured to perform a method as described above.

The computer software may be stored on a computer-readable medium. The computer software may be tangibly stored on the computer readable medium. The computer readable medium may be non-transitory.

According to a still further aspect of the disclosure, there is provided a non-transitory, computer-readable storage medium storing instructions thereon that, when executed by one or more electronic processors, causes the one or more electronic processors to carry out a method as described above.

Any controller or controllers described herein may suitably comprise a control unit or computational device having one or more electronic processors. Thus the system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. A first controller may be implemented in software run on one or more processors. One or more other controllers may be implemented in software run on one or more processors, optionally the same one or more processors as the first controller. Other suitable arrangements may also be used.

Within the scope of this application it is expressly intended that the various aspects, embodiments, examples and alternatives set out in the preceding paragraphs and in the following description and drawings, and the individual features thereof, may be taken independently or in any combination. That is, all embodiments and/or features of any embodiment can be combined in any way and/or combination, unless such features are incompatible.

BRIEF DESCRIPTION OF THE FIGURES

One or more embodiments of the disclosure will now be described by way of example only, with reference to the accompanying drawings, in which.

DETAILED DESCRIPTION

Figure 1:
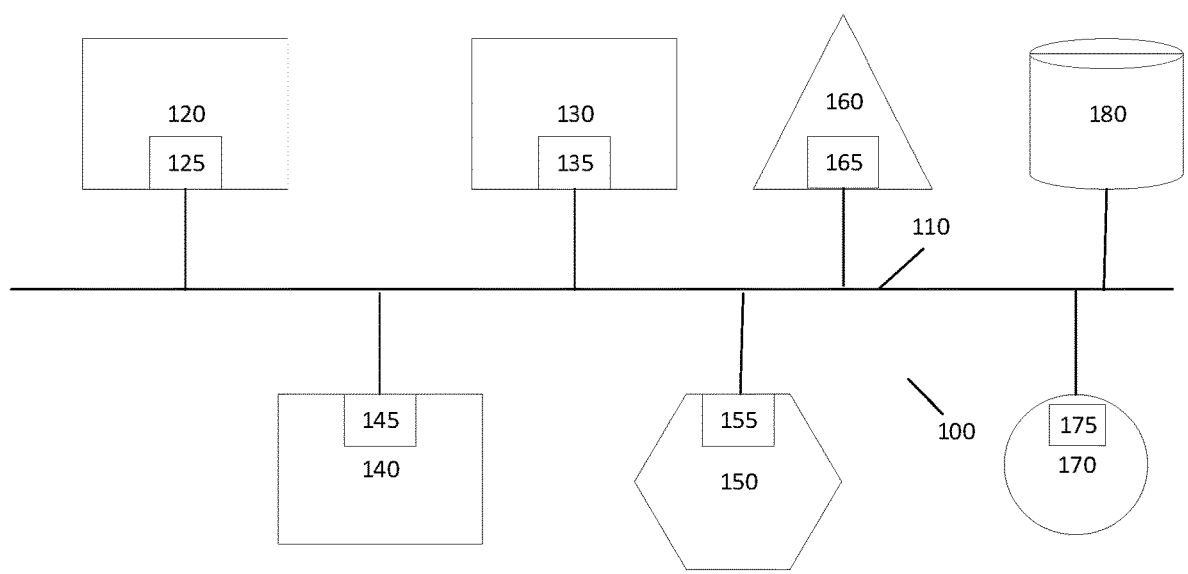
FIG. 1 shows a system according to an embodiment of the disclosure.
Figure 5:
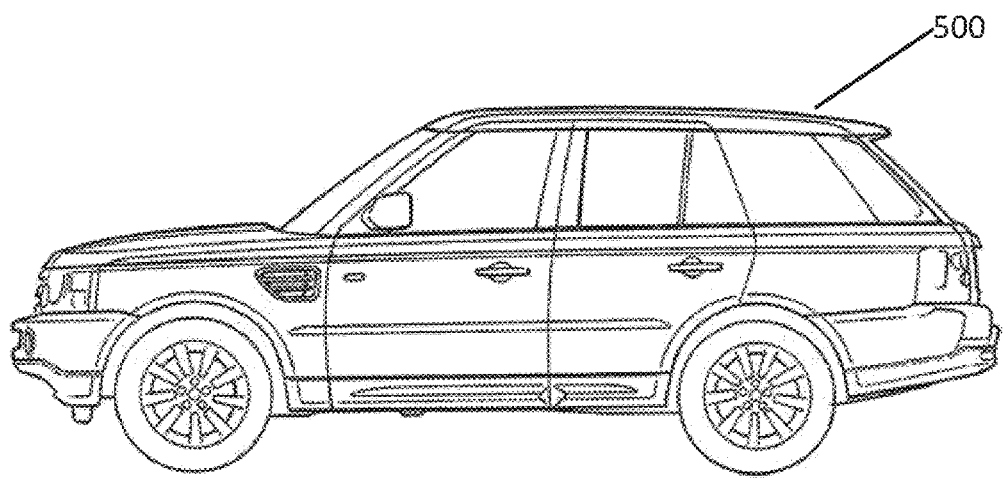
FIG. 5 shows a vehicle according to an embodiment of the disclosure.

FIG. 1 illustrates a system 100 according to an embodiment of the disclosure. The system 100 is a system 100 which may form part of a vehicle 500, such as shown in FIG. 5. The vehicle 500 shown in FIG. 5 is a wheeled, land-going, vehicle 500 although it will be appreciated that the system 100 may form part of an aircraft or watercraft. The vehicle 500 may be an electric vehicle such as a battery electric vehicle (BEV) or hybrid electric vehicle (HEV) for example.

The system 100 supports sharing of predicted attributes between units or modules of the system which can be shared by communication between the units or modules as will be explained. It will be appreciated that the system 100 is illustrated as an example and that the system 100 may have other compositions than that shown i.e. may comprise other numbers of entities from that illustrated. A predicted attribute is a state or value of an attribute at a future point in time, such as a predicted range of a vehicle, or an attribute which may have a plurality of values from which one value is selected as a prediction, such as a destination location of a vehicle. A prediction may have an associated confidence indicative of a certainty of the prediction.

The system 100 comprises a communication means 110 which may be in the form of a communication network 110 of the vehicle 500. The communication network 110 is able to share data between entities present upon the network 110 in the form of electrical signals being modulated on the network 110 to represent the data. The communication network 110 may be in the form of a CANBus network or another IP-based network such as Ethernet or FlexRay, or a combination of different network types. It will be appreciated that the communication network may use other communication protocols and embodiments of the disclosure are not limited in this respect. The communication network 110 will hereinafter be referred to as network 110.

A plurality of entities operably use the network 110 to communicate data about the vehicle 500. In the example shown in FIG. 1 the system 100 comprises three controllers 120, 130, 140 according to an embodiment of the disclosure, and a feature module 150 which supports a feature or function of the vehicle 500, as will be explained. Also forming part of the example system 100 is a feature controller 160, a sensing means 170 and a data store 180 which is accessible to the network 110.

The feature module 150 is responsible for, in use, providing a feature or function of the vehicle to a user of the vehicle. For example, an example of a function of the vehicle is a temperature control function which may control an interior temperature of the vehicle 500. In which case the feature module 150 may be a temperature control module 150 of the vehicle 500. Another example of a feature of the vehicle is a charging control function of the vehicle 500 which controls charging of a battery of the vehicle for providing motive power to the vehicle 500. In which case the feature module may be a charging control module 150 of the vehicle. The feature module 150 provides, in use, control instructions to the feature controller 160 to implement a respective feature of the vehicle. The feature module 150 may comprise a user interface (UI) for interacting with the user of the vehicle 500. For example, the feature module 150 may be operative to output information to the user of the vehicle, such as visually or audibly, and to receive an input from the user of the vehicle, such as a touch input or a voice command. For example the user may provide an indication of a desired temperature or charging instruction via the UI to the temperature control module 150 or charging control module 150, respectively.

The feature controller 160 may control one or more actuators, systems or units of the vehicle 500 to implement the feature e.g. to control a charging system of the vehicle 500. In the case of temperature control, the feature controller 160 may control one or more of an air-conditioning system, seat heating system or cabin heating system of the vehicle 500. In the case of vehicle charging, the feature controller 160 may control a battery charging system of the vehicle 500.

The sensing means 170 may be a sensor or sensor device for measuring one or more parameters associated with the vehicle. For example, the sensing means 170 may be one of a temperature sensor, a pressure sensor, an imaging means such as a camera associated with the vehicle 500 for providing image data internal or external to the vehicle 500, or similar. It will be appreciated that the system 100 may comprise a plurality of sensors of different types and/or arranged or configured to measure different parameters e.g. a fluid temperature and an external temperature of the vehicle 500. Each sensing means 170 may either be polled for information about the measured parameter or may communicate onto the communication network 110 an indication of the measured parameter e.g. at periodic intervals, such that other systems of the vehicle 500 may receive the measurements.

The data store 180 stores data associated with one or both of the vehicle 500 and one or more users of the vehicle 500. The data store 180 may store, for example, schedule information associated with a user of the vehicle 500. The schedule information may indicate a time and location of appointments of the user. The schedule information may indicate not only appointments specifically entered into the schedule by the user, but may store information associated with regular trips made by the user, such as indicating a time that the user regularly travels to a place of work, to collect children from school etc. The data store 180 may be located at the vehicle 500 i.e. may be a data store carried about by the vehicle 500, or may be a data store 180 accessible to the communication network 110 such as hosted at a remote location such as cloud storage. Thus it will be appreciated that the data store 180 may not be local to the vehicle 500.

Each of the feature module 150, feature controller 160, sensing means 170 may comprise an input/output means 155, 165, 175, respectively, for communicating with the communication network 110. The input/output means 155, 165, 175 provides an input means for receiving data at the respective controller from the network 110 and outputting data to the network 110. The input/output means 155, 165, 175 may each be a network interface for interfacing with the network 110.

As described above, the example system 100 comprises three controllers 120, 130, 140. Each controller comprises an input/output means 125, 135, 145, respectively, for communicating with the communication network 110. The input/output means 125, 135, 145 provides an input means for receiving data at the respective controller from the network 110 and outputting data to the network 110. In some embodiments the input/output means 125, 135, 145 is a network interface of each controller 120, 130, 140 which is operative to send and receive data to/from the network 110. A composition of one of the controllers 120, 130, 140 will be further described with reference to FIG. 2 referring to controller 120 as an example with it being understood that each of the controllers 120, 130, 140 may have an identical composition. For ease of explanation, the controller 120 will be referred to as a first controller 120, the controller 130 as a second controller 130 and the controller 140 as a third controller 140.

Figure 2:
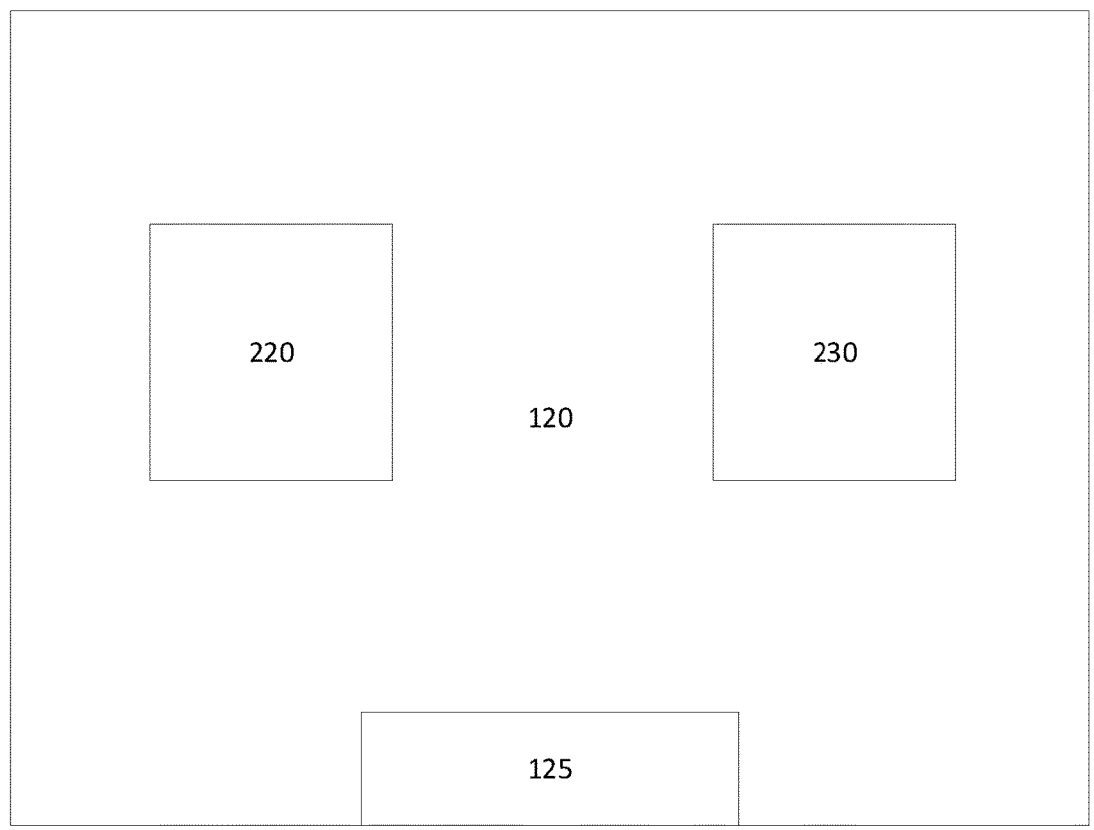
FIG. 2 shows a controller according to an embodiment of the disclosure.

As illustrated in FIG. 2, the first controller 120 comprises a processing means 220 and memory means 230. The memory means 230 may be formed by one or more memory devices, herein memory 230. The processing means 220 may comprise one or more electronic processors, hereinafter processor 220 for executing computer-readable instructions which may be stored in the memory 230. The processor 220 of the controller 120 is arranged or configured to determine a first prediction of a first attribute associated with the vehicle 500. The prediction determined by the processor 220 comprises an indication of the first attribute and an indication of a first confidence value associated with the first attribute, as will be explained. The confidence value is indicative of a confidence of the predicted first attribute i.e. an estimation of a likelihood of the first attribute being correct.

Each of the controllers 120, 130, 140 is arranged or configured to determine a prediction of one or more predetermined attributes associated with the vehicle 500. For example, the first controller 120 is arranged or configured to determine the prediction of the first attribute, the second controller 130 to determine a prediction of a second attribute and the third controller 140 to determine a prediction of a third attribute. It will however be realised that embodiments of the disclosure are not restricted to each controller 120, 130, 140 being able to determine only one prediction. For example, in some embodiments the first controller may be arranged or configured to determine predictions of a plurality of attributes associated with the vehicle 500. In some embodiments, the processor 220 is arranged or configured to operatively execute a self-learning agent for determining the prediction of the first attribute. The self-learning agent may be implemented an Artificial Intelligence (AI) agent, as will be explained.

Each controller 120, 130, 140 is communicatively coupled to the network 110 i.e. via the respective network interface 125, 135, 145 to receive requests for predictions of respective attributes associated with the vehicle 500. A prediction of a respective attribute associated with the vehicle 500 may encompass the attribute being associated with a user of the vehicle 500 i.e. an occupant of the vehicle 500 or a user of the vehicle who may not currently be aboard the vehicle 500 such as when the vehicle is parked or in transit under autonomous control. As an example, a cognitive workload of a driver of the vehicle 500 may be predicted, a comfort of an occupant of the vehicle 500 may be predicted, such as whether the occupant is at a comfortable temperature (too hot, too cold etc), or a mental state of the occupant, for example whether the occupant is feeling stressed.

Following determination of a prediction, each controller 120, 130, 140 is operative to output via the network 110 a prediction response comprising the prediction of the respective attribute. In this way each controller 120, 130, 140 provides an open interface for providing predictions of attributes associated with the vehicle 500 and responding to those requests with predictions of the requested attributes. The request may originate from any other entity communicably coupled to the network 110. Each controller 120, 130, 140 may implement a request handler to receive requests for predictions which may originate from multiple requestors on the network 110. The request handler may queue the requests such that the requests are handled in a sequence by the respective controller 120, 130, 140. In some embodiments, each request may be associated with a priority, for example low, normal and high, wherein the request handler ensures that requests are serviced in dependence, at least in part, on the priority associated with the request. The request handler may be implemented by the processor 220.

Each controller 120, 130, 140 may receive indications of one or more parameters associated with the vehicle 500 or the user, such as from the sensing means 170 via the network 110. As will be described, the controller 120, 130, 140 may use the indication of the parameter in determining a requested prediction. As an example, one of the controllers 120, 130, 140 may receive information indicative of a cabin temperature of the vehicle 500, or a current state of charge of a motive battery of the vehicle 500. At least some of the controllers 120, 130, 140 are operative to access information stored in the data store 180 to obtain data associated with one or both of the vehicle 500 and the user of the vehicle 500. For example, a controller may obtain information associated with a historic rate of discharge of the motive battery of the vehicle 500 from the data store 180 or schedule information associated with the user of the vehicle in order to determine a prediction based thereon.

In an example, the first controller 120 is arranged or configured to determine a prediction of a destination of the vehicle 500. The second controller 130 is arranged or configured to determine a prediction of a range of the vehicle 500, for example a distance from a current location at which the vehicle 500 will require charging of the motive battery. The third controller 140 is arranged or configured to determine a prediction of a suitable geographic location of a charging station for charging the vehicle 500.

A method 300 according to an embodiment of the disclosure will now be described with reference to FIG. 3. The method 300 is a method of utilising predicted information according to an embodiment of the disclosure. The method 300 may be implemented by the system 100 described above with reference to FIG. 1 wherein parts of the method are implemented by at least some of the controllers 120, 130, 140 as will be explained. Reference is also made to FIG. 4a which illustrates a prediction request message 410 and FIG. 4b which illustrates a prediction response message 420 according to respective embodiments of the disclosure.

Figure 3:
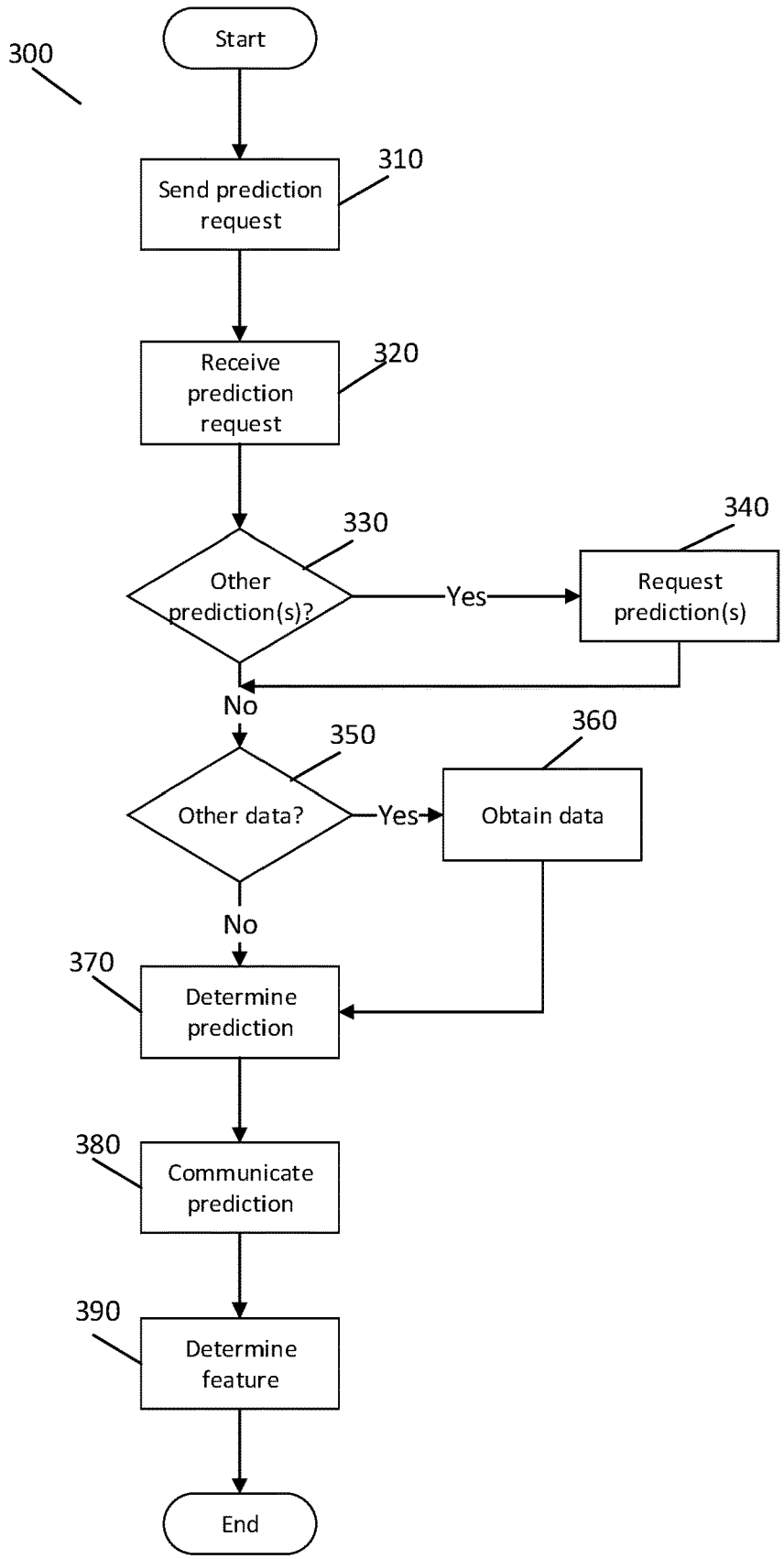
FIG. 3 shows a method according to an embodiment of the disclosure.
Figure 4A:
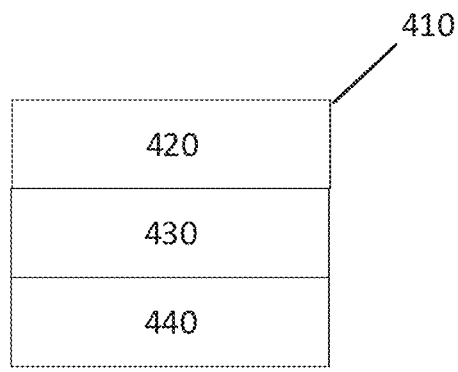
FIGS. 4a-4b schematically illustrates a prediction request and a prediction response according to embodiments of the disclosure.
Figure 4B:
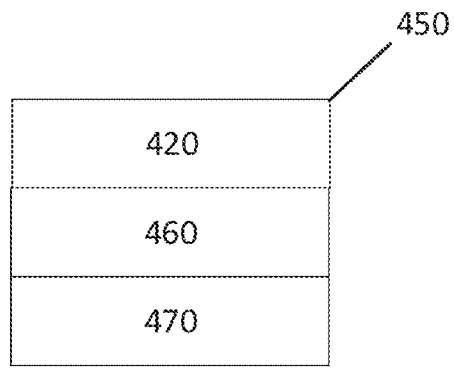

Referring to FIG. 3, the method 300 may be initiated in response to a unit of the vehicle 500 determining that a prediction of an attribute associated with the vehicle 500 is desired. The unit of the vehicle 500 requiring the prediction of the attribute may be the feature module 150. For example, the feature module 150 may be a navigation system of the vehicle, wherein the feature controller 160 is a display device operatively responsive to the feature module 150 for displaying a map of a geographic region including a location of the vehicle 500. The feature module 150 is arranged or configured to display a location of one or more suitable charging locations or charging stations for the vehicle 500 as will be explained. In step 310 of the method 300 the feature module 150 communicates a prediction request 410 onto the network 110.

The prediction request 410 may have a predetermined format such as illustrated in FIG. 4a. The prediction request 410 may be a message comprising a plurality of fields 420, 430, 440. One of the fields, such as a first field 410, may comprise unique identifying information for the prediction request. The unique identifying information may comprise one or both of an ID of the prediction request message and timestamp information. The ID may be a pseudorandom value determined by the feature module 150 which, when formed by a sufficient number of bits, may be considered to uniquely identify the prediction request message 410. The prediction request 410 may comprise a field, such as a second field 420, indicative of an attribute of the vehicle for which it is desired to receive a prediction. For example, the prediction request 410 may identify that a prediction of a suitable charging station for the vehicle 500 is requested. The prediction request 410 may further comprise a field, such as the third field 430, identifying a sender of the prediction request 410 which in this example identifies the feature module 150. The feature module 150 sends the prediction request 410 to a controller suitable for providing a response to the prediction request. In the example the prediction request 410 is sent in step 310 to the third controller 140.

At step 320 of the method 300, the prediction request 410 is received. In the example the prediction request 410 is received at the third controller 140 on the network 110.

For prediction of some attributes associated with the vehicle 500 it is not possible to determine the prediction in isolation without other information. The other information may comprise one or more parameters or data associated with the vehicle 500 i.e. information about the vehicle 500. The other information may comprise a prediction of one or more other attributes associated with the vehicle 500. In step 330 it is determined whether any other predictions of attributes associated with the vehicle 500 are required in order to determine the requested prediction. If so, the method moves to step 340 where prediction requests for the one or more other predictions are sent. Each prediction request may comprise sending a prediction request 410 such as illustrated in FIG. 4a. In the example, the third controller 140 may send a second prediction request 410 via the network 110. The second prediction request is a request for a second prediction of a second attribute associated with the vehicle 500. In the example, the third controller 140 may request a prediction of second and third attributes associated with the vehicle. The second attribute may be a prediction of a range of the vehicle 500. The third attribute may be a prediction of destination of the vehicle 500. Thus, a second prediction request 410 is sent in step 340, in the example from the third controller 140 to the second controller 130, requesting the prediction of the range of the vehicle 500 and a third prediction request 410 is sent from the third controller to the first controller requesting a prediction of the destination of the vehicle 500. After requesting the predictions in step 340, one or more prediction responses may be received at the respective controller from another controller on the network 110.

In step 350 it is determined whether data is required in order to determine any of the requested predictions. For example, in order to determine the prediction of the range of the vehicle requested in step 340 the second controller 130 needs to obtain parameters associated with the vehicle such as, for example, a current temperature and a current battery charge level of the vehicle 500. If in step 350 it is determined that other parameters are required, then the method 300 moves to step 360 where the one or more parameters are obtained. In step 360 the parameters may be obtained by receiving an indication of the one or more parameters from the network 110. For example, an indication of the temperature may be received from the temperature sensor 170 via the network. In some embodiments step 360 may comprise the second controller 130 requesting an indication of the one or more parameters i.e. the second controller may request the temperature sensor 170 to provide an indication of the temperature which is received in response thereto in step 360.

Step 370 comprises determining the prediction. In the example step 370 is performed by each of the first, second and third controllers 120, 130, 140. It will be appreciated that step 370 may not be performed simultaneously by each of the controllers 120, 130, 140 since in order for at least some of the controllers to determine their respective prediction the prediction of another controller may be required to be used in the determination of the prediction. Thus step 370 may be performed by each controller 120, 130, 140 at different times, such as in a cascade fashion.

The respective prediction is determined by the processor 220 of each controller 120, 130, 140. The prediction may be based on data stored in the memory 230 of the controller 120, which may be indicative of one or more past events. For example, the memory may contain data indicative of the range of the vehicle for past journeys, such that the current range of the vehicle 500 may be predicted. The processor 220 operatively executes a prediction agent for determining the prediction of the attribute requested. The prediction agent may use the data stored in the memory 230 of the controller to provide the prediction of the attribute. In some embodiments the processor 220 is arranged or configured to operatively execute a self-learning prediction agent for determining the prediction of the attribute. The self-learning prediction agent may be an artificial intelligence (AI) agent for predicting the attribute. The self-learning prediction agent may be, for example, a neural network for predicting the attribute which is arranged or configured to learn or adapt based on historic data in order to determine the prediction with better accuracy. The prediction may be based on the one or more parameters received in step 360. The prediction may be based on responses to the one or more predictions requested in step 340. Thus, the predictions at some controllers 120, 130, 140 on the network may only be determined following determination of, and receipt of, prediction responses from other controllers. The self-learning agent may store information in the data store indicative of previous predictions in order to perform a training process of the self-learning agent to thereby adapt over time usage of the system.

In step 380 a prediction response is communicated, in the example, from the third controller 140. It will be appreciated that for the first and second controllers 120, 130 step 380 is performed prior to step 370 being performed at the third controller i.e. so that the prediction responses from the first and second controllers 120, 130 are available at third controller 140 when said third controller 140 performs step 370. The prediction response 450 has a predetermined format such as that illustrated in FIG. 4b.

The prediction response 450 may be a message comprising a plurality of fields 420, 460, 470. One of the fields, such as a first field 420, may comprise unique identifying information corresponding to that of the prediction request 410. The unique identifying information may comprise one or both of an ID of the prediction request message and timestamp information. In this way the prediction response 450 may be associated at the recipient i.e. the third controller 140, with the prediction request 410. The prediction response 450 further comprises a second field 460 which comprises an indication of the attribute 460 for which the prediction was requested, and, as a third field 470, an indication of a first confidence 470 associated with the prediction of the attribute. The first confidence is indicative of a likelihood that the first attribute is correct. For example, an indication of the first confidence being 95% may be understood to mean that 95 out of 100 times the first prediction is correct. In the example, the third controller 140 is arranged or configured to determine the prediction of the suitable charging station for the vehicle 500, and therefore the prediction response 450 contains an indication of the suitable charging station for the vehicle 500. The indication may be, for example, geographic coordinates indicating a location of the charging station or a reference to an identifier of the charging station such as a name or other identifying information which is stored in the second field 450. The third field 470 stores a confidence value indicative of a confidence in the prediction. The confidence value may indicate that the processor 220 of the third controller 140 has determined the prediction with a high degree of confidence, for example. The confidence value may be a value between a maximum and minimum confidence values such as 100 and 0, although other confidence values may be used.

In step 390 the prediction response 450 is received at the feature module 150. The feature module 150 is arranged or configured to utilise the prediction to provide the feature or function of the vehicle 500 to the user. For example, in the described example the feature module 150 may display an indication of the location of the charging station in order to assist the user in driving the vehicle to the location for charging.

It will be appreciated that embodiments of the present disclosure provide an open architecture in which predictions of attributes may be requested and communicated over a network 110 of the vehicle 500. In this way, the prediction agent operatively executing on the processor 220 may be utilised by a number of other entities communicatively coupled to the network 110.

It will be appreciated that embodiments of the present disclosure can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present disclosure. Accordingly, embodiments provide a program comprising code for implementing a system or method and a machine readable storage storing such a program. Still further, embodiments of the present disclosure may be conveyed electronically via any medium such as a communication signal carried over a wired or wireless connection and embodiments suitably encompass the same.

All of the features disclosed in this and/or all of the steps of any method or process so disclosed, may be combined in any combination, except combinations where at least some of such features and/or steps are mutually exclusive.

Each feature disclosed in this specification may be replaced by alternative features serving the same, equivalent or similar purpose, unless expressly stated otherwise. Thus, unless expressly stated otherwise, each feature disclosed is one example only of a generic series of equivalent or similar features.

The disclosure is not restricted to the details of any foregoing embodiments. The disclosure extends to any novel one, or any novel combination, of the features disclosed in this specification—or to any novel one, or any novel combination, of the steps of any method or process so disclosed.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A controller, comprising:
an input configured to receive, from a communication network associated with a vehicle, a first request for a first prediction of a first attribute associated with the vehicle at a future point in time;
an output configured to output, via the communication network, a first prediction response comprising the first prediction; and
a processor comprising one or more electronic processors, the processor configured to:
determine, in dependence on the first request, that a second prediction of a second attribute associated with the vehicle is needed in order to determine the first prediction, and in response, control the output to output, via the communication network, a second request for the second prediction of the second attribute associated with the vehicle and to receive, via the input, a second prediction response comprising an indication of the second attribute and an indication of a second confidence associated with the second attribute; and determine the first prediction of the first attribute in dependence on the second prediction response, wherein the first prediction comprises an indication of the first attribute at the future point in time and an indication of a first confidence associated with the indication of the first attribute.

2. The controller of claim 1, wherein the processor is further arranged to:
control the output to output, via the communication network, a third request for third prediction of a third attribute associated with the vehicle and to receive via the input a third prediction response comprising an indication of the third attribute and an indication of a third confidence associated with the third attribute; and
determine the first prediction response in dependence on the second and third prediction responses.

3. The controller of claim 1, wherein the processor is arranged to control the output to output, via the communication network, a third request for data associated with the vehicle and to receive via input data corresponding to the request, wherein the processor is arranged to determine the first prediction in dependence on the second prediction response and the received data.

4. The controller of claim 1, wherein the processor is arranged to operatively execute a self-learning agent for determining the first prediction of the first attribute.

5. The controller of claim 1, wherein the first request for the first prediction of the first attribute comprises a message having a predetermined format.

6. The controller of claim 1, wherein the first prediction response comprises a message having a predetermined format comprising the indication of the first attribute and the first confidence.

7. The controller of claim 1, wherein the first prediction response comprises unique identifying information.

8. A system, comprising:
a first controller;
a second controller;
a first feature module supporting a feature of a vehicle; and
a communication network for supporting communication between the first controller, the second controller, and the first feature module;
wherein the first feature module is arranged to output, via the communication network, a first request for a first prediction of a first attribute associated with the vehicle at a future point in time, the first controller is arranged to receive the request via the communication network and determine that a second prediction of a second attribute associated with the vehicle is needed in order to determine the first prediction, and in response, output, via the communication network, a second request for the second prediction,
wherein the second controller is arranged to receive the second request via the communication network, determine the second prediction of the second attribute in dependence on the second request, wherein the second prediction comprises an indication of the second attribute and an indication of a confidence associated with the second attribute, and to output, via the communication network, a second prediction response comprising the second prediction, and
wherein the first controller is arranged to determine the first prediction in dependence on the second prediction and to output a first prediction response via the communication network to at least the first feature module, the first prediction response including the first prediction, the first prediction comprising an indication of the first attribute at the future point in time and an indication of a confidence associated with the first attribute.

9. The system of claim 8, wherein the first feature module is arranged to control one or more systems of the vehicle in dependence on the first prediction response.

10. The system of claim 8, wherein the first prediction response is received by the first feature module and a second feature module via the communication network.

11. The system of claim 8, wherein the first controller is arranged to:
output, via the communication network, a request for a third prediction of a third attribute associated with the vehicle and to receive via the communication network a third prediction response comprising the third prediction, wherein the third prediction comprises an indication of the third attribute and an indication of a confidence associated with the third attribute; and
determine the first prediction of the first attribute in dependence on the second prediction and the third prediction.

12. The system of claim 8, wherein the communication network comprises a CANBus network arranged to communicably couple the first controller, the second controller, and the first feature module.

13. The system of claim 12, wherein each prediction response is a message output onto the communication network for receipt by one or more network nodes.

14. The controller of claim 1, wherein the controller is comprised within the vehicle.

15. A method, comprising:
receiving from a communication network associated with a vehicle a request for a first prediction of a first attribute associated with the vehicle at a future point in time;
outputting, via the communication network, a request for second prediction of a second attribute associated with the vehicle;
receiving, via the communication network, a second prediction response comprising an indication of the second prediction of the second attribute and an indication of a second confidence associated with the second prediction of the second attribute;
determining the first prediction of the first attribute in dependence on the request and the second prediction response, and determining an indication of a confidence associated with the first prediction of the first attribute at the future point in time; and
outputting, via the communication network, a first prediction response comprising the indication of the first prediction of the first attribute and the indication of the confidence associated with the first prediction of the first attribute.

16. The method of claim 15, further comprising:
outputting, via the communication network, a request for third prediction of a third attribute associated with the vehicle;
receiving, via the communication network, a third prediction response comprising the indication of the third prediction of the third attribute and an indication of a confidence associated with the third prediction of the third attribute; and
determining the first prediction of the first attribute in dependence on the second and third prediction responses.

17. A non-transitory, computer-readable storage medium storing instructions that, when executed by one or more electronic processors, cause the one or more electronic processors to carry out the method according to claim 15.

18. The system of claim 11, wherein the first prediction is a prediction of a suitable charging station for the vehicle, the second prediction is a prediction of a range of the vehicle, and the third prediction is a prediction of a destination of the vehicle.

\* \* \* \* \*